United States Patent [19]

Dey

[11] 4,324,517

[45] Apr. 13, 1982

[54] PANEL FASTENER ASSEMBLY WITH RETAINER RING

[75] Inventor: Ervin J. Dey, Sante Fe Springs, Calif.

[73] Assignee: SPS Technologies, Inc., Jenkintown, Pa.

[21] Appl. No.: 159,334

[22] Filed: Jun. 16, 1980

[51] Int. Cl.³ .............................................. F16B 41/00
[52] U.S. Cl. ..................................... 411/353; 411/105
[58] Field of Search ............... 411/353, 352, 105, 104, 411/103, 517, 518, 519, 511, 337, 530

[56] References Cited

U.S. PATENT DOCUMENTS

| | | | |
|---|---|---|---|
| 2,742,072 | 4/1956 | Murphy | 411/105 |
| 2,991,816 | 7/1961 | Harbison et al. | 411/111 |
| 3,180,388 | 4/1965 | Newcomer, Jr. et al. | 411/353 |
| 3,221,589 | 12/1965 | Vander Sande et al. | 411/49 |
| 3,232,088 | 1/1966 | Newcomer, Jr. et al. | 411/530 X |
| 3,397,727 | 8/1968 | Orosz | 411/105 |
| 3,765,465 | 10/1973 | Gullistan | 411/353 |

*Primary Examiner*—Ramon S. Britts
*Attorney, Agent, or Firm*—Aaron Nerenberg

[57] ABSTRACT

A quick-acting panel fastener assembly for joining a panel to a sub-structure is disclosed. The fastener assembly includes a sleeve bolt, a grommet assembly which is attached to the panel and a receptacle assembly which is attached to the sub-structure. The sleeve bolt passes through the grommet assembly and engages the receptacle assembly thereby joining the panel and the sub-structure. The grommet assembly includes a retainer ring which engages a groove in the sleeve bolt when it is in its withdrawn position so that the sleeve bolt is retained in the panel and remains in its withdrawn position when the panel is disengaged from the sub-structure.

12 Claims, 8 Drawing Figures

PANEL FASTENER ASSEMBLY WITH RETAINER RING

BACKGROUND OF THE INVENTION

1. Field of the Invention

This invention relates to quick acting panel fastener assemblies in general and to a fastener assembly with improved retaining and locking means for stress access panels in aircraft and the like.

2. Description of the Prior Art

As is well known to those skilled in the art, the external surface or skin of aircraft is designed to provide a significant amount of structural strength. It is common for numerous access panels to be strategically located on aircraft through which access may be had to electronics, hydraulics, controls, and other equipment or structure within the aircraft. In order to maintain the structural efficiency of the aircraft skin, these panels must also be designed to carry their share of the load. Therefore, when a panel is removed the sub-structure is stressed due to the lack of support provided by the panel and as a result the sub-structure yields or deflects to a limited degree. The movement of the under structure occurs gradually as the fasteners are removed so that the last of the fasteners of the panel to be removed are the most affected by residual shear, making their removal the most difficult. In replacing a panel, the fasteners must have sufficient strength to pull the warped or deflected panel and the sub-structure tightly together and must have a large tolerance to enable them to pull the misaligned holes into place.

In view of the load carrying requirement of the access panels and the fasteners, it is extremely important that the fasteners are not lost during the removal of the panel from the aircraft. Loss of a sleeve bolt in many cases would require that the aircraft be grounded until a replacement could be located. Accordingly, it is extremely important that the sleeve bolts be secured or retained in the access panel when it is removed from the aircraft sub-structure.

Particular aircraft access panels range widely in size. The number of fasteners required to secure a particular panel to its mating sub-structure depends not only on the size of the panel but the location of the panel and the amount of stress which it was designed to carry. Accordingly, it is not uncommon for such panels to require a multiplicity of fasteners. In reinstalling a previously removed panel to its mating sub-structure it is necessary that the sleeve bolts, which are connected to the panel, be secured in their withdrawn position to aid in the rapid reinstallation of the panel.

Quick acting fasteners of the type described in U.S. Pat. No. 2,991,816 have been widely accepted for aerospace use as an effective fastener for joining a panel to a sub-structure. Such fasteners include a grommet assembly which is attached to the panel and through which a sleeve bolt passes to engage a receptacle assembly that is attached to the aircraft sub-structure. The grommet assembly retains the sleeve bolt in the panel when the panel is disengaged from the sub-structure and maintains it in a fully withdrawn position while the panel is disengaged to aid in rapid replacement of the panel.

Panel fasteners of the type described are relatively expensive, and since they form a portion of the aircraft structure, they must be highly reliable and remain locked once the threads of the sleeve bolt are fully engaged. To insure such a lock, the sleeve bolt is typically squeezed or deformed in order to provide local deformation of the internal threads therein to effect a high frictional force between the mating threads of the sleeve bolt and the receptacle assembly stud, as illustrated in U.S. Pat. No. 2,991,816.

Depending on the degree of deformation of the sleeve bolt, the mating threads of the sleeve bolt and stud gradually wear sufficiently to reduce the amount of friction therebetween, so that the locking feature is eventually reduced, and is sometimes completely lost. When this occurs, the relatively expensive sleeve bolt and receptacle assembly must be replaced in order to insure that a prevailing torque lock exists between the threaded members.

The requirement that the sleeve bolt must be retained in the panel structure when not threadably engaged on the receptacle assembly, is accomplished by means of a resilient spring member which engages a groove adjacent an enlarged flange on one end of the sleeve bolt. This resilient spring, as shown in U.S. Pat. No. 2,991,816, expands over the progressively increasing diameters of the sleeve bolt when it is advanced through a hole in the panel to engage the threaded receptacle assembly. The spring and sleeve bolt described in U.S. Pat. No. 2,991,816 are relatively expensive to manufacture and have not been entirely satisfactory in reliably and consistently retaining the sleeve bolt in the panel, when the panel is disengaged from the aircraft sub-structure.

U.S. Pat. Nos. 3,180,388, 3,221,589, 3,232,088 and 3,397,727 show split star-shaped retaining rings, as does U.S. Pat. No. 2,991,816. Such retaining rings are expensive to manufacture and are not always as effective as designed in retaining sleeve bolts to aircraft access panels.

SUMMARY OF THE INVENTION

It is accordingly an object and purpose of the present invention to provide an improved, simplified panel fastener assembly.

It is another object of the present invention to provide an improved, simplified panel fastener assembly for use in structural applications in aircraft.

It is a further object of the present invention to provide a panel fastener assembly having an improved locking mechanism for securing the sleeve bolt to the receptacle assembly, thereby providing greatly increased service life.

It is a primary object of the present invention to provide an improved means for reliably retaining a sleeve bolt in an access panel when it is disengaged from its sub-structure.

It is yet another object of the present invention to provide a more efficient and economical means for retaining a sleeve bolt in a panel assembly.

It is still a further object of the present invention to provide a panel fastener assembly capable of being reinstalled while initially being at a non-perpendicular angle with respect to the panel surface so that the panel may be installed on non-parallel surfaces of an aircraft structure.

It is still another object of the present invention to provide a panel fastener assembly in which the receptacle assembly may be more efficiently mounted on the sub-structure of an aircraft.

These and other objects of the present invention are accomplished by the quick acting fastener assembly of the present invention. The present fastener assembly includes a receptacle assembly including a threaded stud which is mounted on the sub-structure, a grommet assembly which is attached to the access panel, and a sleeve bolt which is retained by the grommet assembly. The panel is connected to the aircraft sub-structure by threadably engaging the sleeve bolt on the receptacle assembly.

The grommet assembly includes a resilient annular split retainer which is adapted to engage an annular groove on the sleeve bolt, which passes through the grommet assembly, thereby securing it to the access panel when the panel is removed from the aircraft and maintaining the sleeve bolt in a fully withdrawn position thereby simplifying the reinstallation of the access panel to the aircraft.

Other and further objects of this invention will become apparent to those skilled in the art upon consideration of the following specification when read in conjunction with the attached drawings, in which like numerals refer to like parts.

DESCRIPTION OF THE PREFERRED EMBODIMENTS

Figure 1:
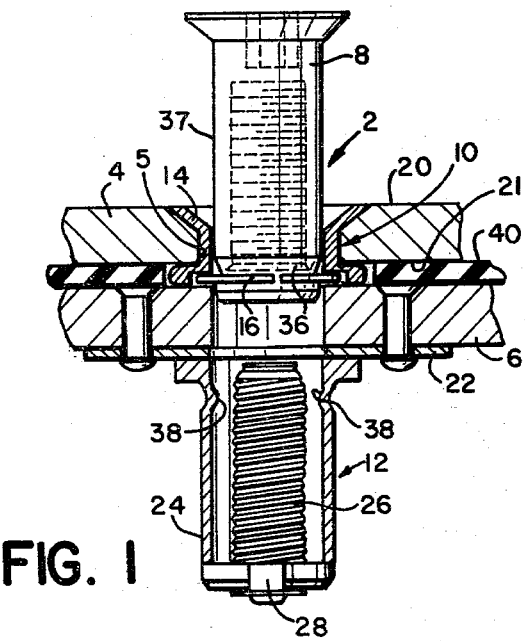
FIG. 1 is a side elevation view in cross section showing a panel fastener assembly in accordance with the present invention, associated with a panel and a sub-structure.

Referring now to FIG. 1, a fastener assembly 2 in accordance with the present invention is shown associated with a structural panel 4 and a sub-structure 6. Fastener assembly 2 includes a sleeve bolt 8, a grommet assembly 10 and a receptacle assembly 12.

Grommet assembly 10 is shown installed in an opening 5 in access panel 4 in its withdrawn position. As shown in greater detail in FIG. 5, grommet assembly 10 includes a body 14 and a resilient circular retainer ring 16. Although not shown in FIG. 1, grommet assembly 10 may also include a grommet cup 18, as will hereinafter be discussed. In FIG. 1, grommet body 14 is shown attached to access panel 4 by expanding the outer portion thereof to conform with a counterbore formed in surface 20 of the access panel 4.

Figures 5, 8:
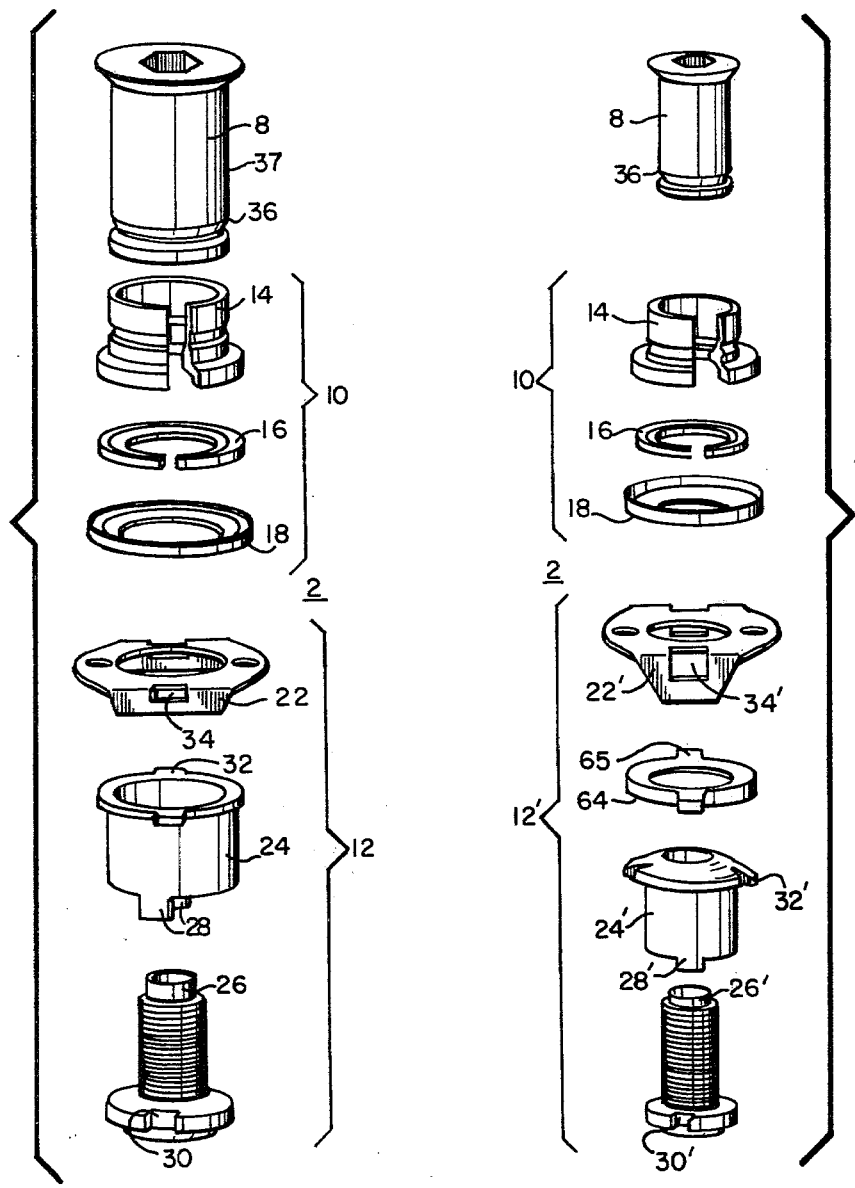
FIG. 5 is an exploded pictorial view of the elements of the fastener assembly of the present invention.
FIG. 8 is an alternate embodiment of the receptacle assembly.

Receptacle assembly 12 includes a receptacle bracket or basket 22, a barrel 24 and an externally threaded stud 26. Tabs 28 on barrel 24 mate with a pair of slots 30 formed in base of stud 26 and are deflected inwardly to engage the stud and connect the barrel thereto. As shown in FIG. 5, barrel 24 also includes tabs 32 which are inserted in a pair of slots 34 formed in basket 22, thereby connecting the barrel to the basket. Slots 34 are circumferentially greater in length than the width of the tabs 32 thereby permitting the barrel and stud to rotate to a limited degree with respect to basket 22. Basket 22 is secured to sub-structure 6 by any suitable means, such as by rivets 31. It should be understood that while receptacle assembly 12 and basket 22 have been illustrated and described as an assembly of individual elements, they could comprise a single element without departing from the spirit and scope of the invention.

The internally threaded sleeve bolt 8 is shown in FIG. 1 in its disengaged and withdrawn position with respect to panel 4. Sleeve bolt 8 is shown secured by retainer ring 16 engaging a groove 36 formed in the sleeve bolt. As can readily be seen, by pushing sleeve bolt 8 toward stud 26, the split retainer ring 16 will expand over the outer surface 37 of sleeve bolt 8 permitting axial movement of the sleeve bolt toward the stud. Rotation of sleeve bolt 8 will cause it to threadably engage stud 26 of receptacle assembly 12. In the preferred embodiment of the invention, sleeve bolt 8 and stud 26 have double lead threads in order to decrease the time and motion required to remove and reinstall the panel.

Barrel 24 may include inwardly facing protrusions 38 which frictionally engage the exterior surface 37 of sleeve bolt 8 when it is threadably engaged on stud 26, thereby securely locking the sleeve bolt to receptacle assembly 12 when panel 4 is secured to sub-structure 6. In the preferred embodiment, protrusions 38 are produced by forcibly deforming the outside of barrel 24 by applying pressure thereto. It should be understood that any suitable friction lock between the internal surface of barrel 24 and the external surface 37 of sleeve bolt 8 would suffice. Another example of such a friction lock is a plastic insert installed through the side of barrel 24.

Figure 2:
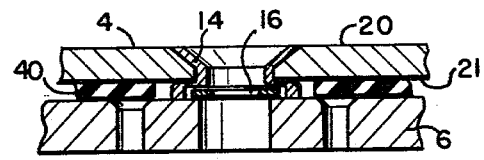
FIG. 2 is a side elevation view depicting the relationship between the panel, sub-structure, grommet, and split ring as shown in FIG. 1.

Grommet assembly 10, panel 4 and sub-structure 6 illustrated in FIG. 1 are shown in greater detail in FIG. 2.

As previously indicated, grommet assembly 10 includes grommet body 14 and split retainer ring 16. Grommet body 14 may fit flush against the inner surface of panel 4. However, in some instances, the thickness of panel 4 and sealing requirements may necessitate the use of a gasket 40 between the panel 4 and sub-structure 6. In this embodiment of the invention, ring 16 and sleeve bolt 8 each secure the other to panel 4. As can better be seen in FIG. 2 with the absence of sleeve bolt 8, no structure is provided to secure retainer ring 16 to grommet assembly 10.

Figure 3:
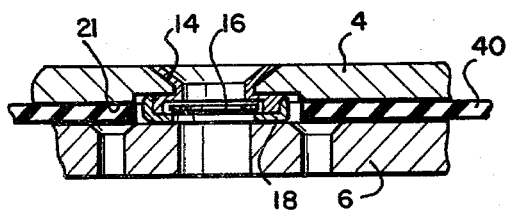
FIG. 3 is a side elevation view in cross section showing an alternate arrangement of the grommet assembly, panel and sub-structure.
Figure 4:
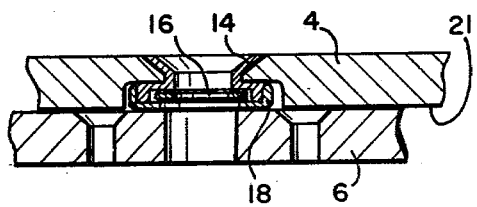
FIG. 4 is a side elevation view in cross section of another alternate arrangement of the grommet assembly, panel, and sub-structure.

Referring now to FIGS. 3 and 4, as well as FIG. 5, a grommet cup 18 may be provided to secure ring 16 to grommet body 14. In FIG. 3 a partial recess has been formed in inner surface 21 of panel 4 to receive a portion of grommet assembly 10. In FIG. 4 a recess of sufficient depth has been formed in surface 21 to permit the grommet assembly to fit flush with the inner surface of panel 4. This embodiment is applicable to those situations wherein the thickness of panel 4 permits the use of a countersink and the sealing requirements do not necessitate use of a gasket.

Figure 6:
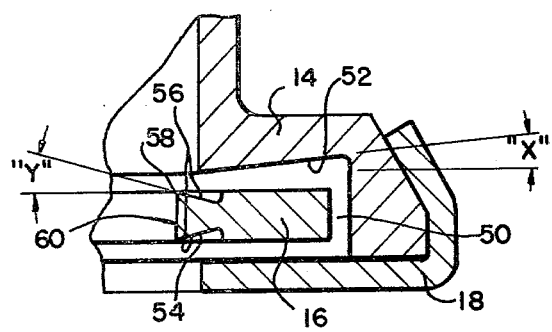
FIG. 6 is an enlarged side elevation view in cross section of a portion of the grommet assembly showing the groove arrangement.

Reference will now be made to FIG. 6 where an enlarged view of a portion of grommet assembly 10 is shown. Retainer ring 16 is shown positioned within grommet body 14 and secured thereto by cup 18. Retainer ring 16 fits within a cavity 50 formed by body 14 and cup 18. Surface 52 of the grommet body 14 forms the upper portion of cavity 50, and is inclined upwardly and outwardly from the nominal plane of the cavity 50. The angle of surface 52 with respect to a plane which is perpendicular to the centerline of body 14 is shown as "x".

Retainer ring 16, as previously described is a circular split ring which provides circumferential resilience. Retainer ring 16 has upper and lower annular grooves 54 adjacent its inner periphery. Grooves 54 form upper and lower surfaces 56 which are at an angle "y" with respect to the plane of ring 16. It is important to note that surfaces 56 form sharp edges 58 with the radially innermost surface 60 of ring 16. As will hereinafter be discussed, edges 58 and angle y are important to the present invention.

Figure 7:
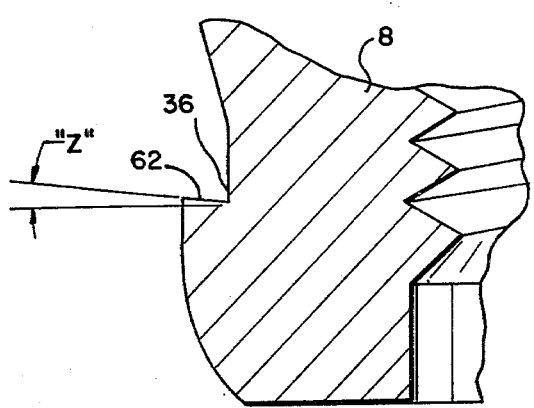
FIG. 7 is an enlarged side elevation view in cross section of a portion of the sleeve bolt assembly.

In an alternate embodiment of the invention (not shown), top groove 54 and its attendant sharp edge 58 are eliminated from the top of retainer ring 16. This is done to enable retainer ring 16 to be manufactured so as to have minimum thickness, a requirement for some applications. As long as groove 54 and its attendant sharp edge 58 are on the lower surface, or sub-structure side of the retainer ring, the advantage of the groove is not lost. However, both grooves are generally desired so that the possibility of installing the retainer ring upside down is eliminated As shown in FIG. 7, annular groove 36 in sleeve bolt 8 has a lower surface 62 which forms an angle "z" with respect to a plane perpendicular to the axis of the sleeve bolt.

The angles just identified x, y, and z result in the present invention being extremely effective in retaining sleeve bolt 8 in the grommet assembly 10 and hence, in panel 4 when the sleeve bolt is disengaged. In the devices of the prior art these angles have essentially been equal to zero degrees, as previously defined herein. This has resulted in a couple being created, on occasion, when sleeve bolt 8 is forcibly angularly displaced from its perpendicular orientation with respect to the panel surface in its fully withdrawn position, while being secured by ring 16 positioned within groove 36. The couple, or moment, is created when the prior art geometry causes the split ring to be forced between surface 62 of sleeve bolt 8 and surface 52 of the grommet body, thus forcing resilient ring 16 to expand over surface 92, and permitting sleeve bolt 8 to become disengaged from grommet assembly 10 and panel 4. This action directly results in loss of bolt 8 and the attendant problems previously described.

It has been discovered that the incidence of sleeve bolt disengagement from grommet assembly 10 can be significantly reduced by causing angle x to be within the range of three (3) to eight (8) degrees and substantially five (5) degrees in the preferred embodiment. Of somewhat lesser, but still significant importance is angle z formed by surface 62 of sleeve bolt 8. Angle z should also be within the range of three (3) to eight (8) degrees in the preferred embodiment for optimum effectiveness, and preferrably five (5) degrees.

Angle y formed by surfaces 56 on ring 16 should be within the range of seven (7) to fifteen (15) degrees and is fifteen (15) degrees in the preferred embodiment.

The effect of the preferred angular relationships just described is to reduce the moment or couple on ring 16 when the sleeve bolt is forcibly angularly displaced while retainer ring 16 is positioned within groove 36 of sleeve bolt 8. The reduction of the moment which would otherwise be present results in the ring not being expanded, thereby substantially reducing, if not eliminating the disengagement of sleeve bolt 8 from grommet assembly 10 and panel 4.

An alternate embodiment of receptacle assembly 12 is shown in FIG. 8. Receptacle assembly 12' in FIG. 8 is similar to that shown in FIG. 5 except that a washer 64 is positioned between basket 22' and barrel 24'. Barrel 24' includes tabs 32' and washer 64 includes tabs 65 extending radially outwardly, similar to tabs 32 on barrel 24 in FIG. 5. Tabs 32' and 65 are received by slots 34' in basket 22'. Washer 64 and barrel 24' have mating curved surfaces which permit relative movement therebetween. This permits stud 26', which is attached to barrel 24' by means of tabs 28' engaging a pair of slots 30' in the base of stud 26', to angularly deflect, thereby aiding in the engagement of sleeve bolt 8 thereto. This is particularly advantageous when sub-structure 6 has significantly deflected from the original hole pattern in panel 4.

While the fastener assembly of the present invention has been described with reference to several preferred embodiments, it is to be understood that various changes and modifications may be made within the scope and spirit of the invention, and the claims which are appended hereto are intended to define the scope of the invention.

What is claimed is:

1. An improved quick-acting fastener assembly for joining a panel to a substructure including a grommet assembly having an annular body which is adapted to be secured to the panel and an annular resilient retainer having a split therein, said annular body being adapted to receive said retainer; a receptacle assembly which is adapted to be connected to the substructure including a threaded stud; and a threaded sleeve bolt having a head at one end formed to abut the panel and adapted to threadably engage said stud, said sleeve bolt having an annular groove adjacent the other end thereof and being adapted to be engaged by said retainer at said groove to secure said sleeve bolt to said grommet assembly when said sleeve bolt is threadably disengaged from said stud, the improvement characterized in that said annular body includes an annular cavity which is adapted to receive said retainer, said cavity having an outwardly sloping surface forming an angle x greater than zero degrees with respect to a plane perpendicular to the centerline of said body.

2. An assembly as defined in claim 1, characterized in that said angle x is within the range of 3 to 8 degrees.

3. An assembly as defined in claim 1 characterized in that said retainer includes upper and lower annular grooves having upper and lower surfaces formed therein adjacent the inner periphery of said retainer, said surfaces each being at an angle y within the range of 7 to 15 degrees with respect to the plane of said retainer.

4. An assembly as defined in claim 3, characterized in that said groove formed in said sleeve bolt includes an upwardly sloping surface formed on the lower face of said groove, said surface being at an angle z within the range of 3 to 8 degrees with respect to a plane perpendicular to the centerline of said sleeve bolt.

5. An assembly as defined in claim 3, characterized in that said retainer has sharp edges formed at the respective intersection of each of said upper and lower surfaces and the radially innermost surface thereof.

6. An assembly as defined in claim 2, characterized by angle x being substantially equal to 5 degrees.

7. An assembly as defined in claim 3, characterized by angle y being substantially equal to 15 degrees.

8. An assembly as defined in claim 4, characterized by angle z being substantially equal to 5 degrees.

9. An assembly as defined in claim 1, characterized in that said receptacle assembly further includes friction means adapted to frictionally engage said sleeve bolt when said sleeve bolt is threadably engaged with said stud thereby preventing relative movement therebetween by providing a locking means.

10. An assembly as defined in claim 9, characterized in that said friction means includes inwardly facing protrusions extending from the interior portion of said receptacle assembly.

11. An assembly as defined in claim 1, characterized in that said receptacle assembly further includes a receptacle bracket adapted to be connected to the substructure and having a pair of opposed slots therein; a washer having a curved face and pair of opposed tabs thereon adapted to be inserted into said slots; and a barrel having a curved face adapted to abut and substantially conform to said curved face of said washer, said barrel having a pair of opposed tabs thereon adapted to be inserted into said slots, said stud being connected to said barrel, thereby permitting said stud to angularly deflect with respect to said bracket.

12. An assembly as defined in claim 1, characterized in that said annular resilient retainer is circular.

* * * * *